United States Patent
Moll

(10) Patent No.: US 9,760,498 B2
(45) Date of Patent: Sep. 12, 2017

(54) HYBRID CACHE COMPRISING COHERENT AND NON-COHERENT LINES

(71) Applicant: QUALCOMM Technologies Inc., San Diego, CA (US)

(72) Inventor: Laurent Rene Moll, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/498,051

(22) Filed: Sep. 26, 2014

(65) Prior Publication Data

US 2016/0092360 A1 Mar. 31, 2016

(51) Int. Cl.
 G06F 12/00 (2006.01)
 G06F 12/0895 (2016.01)
 G06F 12/0811 (2016.01)
 G06F 12/0837 (2016.01)

(52) U.S. Cl.
 CPC ...... *G06F 12/0895* (2013.01); *G06F 12/0811* (2013.01); *G06F 12/0837* (2013.01); *G06F 2212/1041* (2013.01)

(58) Field of Classification Search
 None
 See application file for complete search history.

(56) References Cited

U.S. PATENT DOCUMENTS

| | | | |
|---|---|---|---|
| 8,176,259 B2* | 5/2012 | Van Doren | G06F 12/0828 711/141 |
| 2007/0180197 A1* | 8/2007 | Wright | G06F 12/0808 711/141 |
| 2012/0233472 A1* | 9/2012 | Faraboschi | G06F 12/0246 713/190 |
| 2014/0223096 A1* | 8/2014 | Zhe Yang | G06F 12/0871 711/114 |

* cited by examiner

*Primary Examiner* — Adam M Queler
*Assistant Examiner* — Jason Blust
(74) *Attorney, Agent, or Firm* — MG-IP Law, P.C.

(57) ABSTRACT

An electronic system for multiple agents, both coherent and non-coherent, to communicate with a hybrid cache, the hybrid cache to provide functionality associated with a cache for coherent agents in an outer shareable domain, and to provide functionality associated with a cache for non-coherent agents in a system shareable domain, the functionality provided by tag fields in cache lines stored in the hybrid cache. The tag fields are configured to indicate if a cache line of the hybrid cache belongs to at least one of a logical coherent cache or a logical system cache.

28 Claims, 6 Drawing Sheets

HYBRID CACHE COMPRISING COHERENT AND NON-COHERENT LINES

FIELD OF DISCLOSURE

Embodiments pertain to a cache with cache lines configurable as coherent, non-coherent or both. Exemplary aspects pertain to a hybrid cache with tag fields configured to indicate if a cache line of the hybrid cache belongs to a logical coherent cache, a logical system cache, or both a logical coherent cache and a logical system cache

BACKGROUND

Caches are used extensively in modern integrated circuits (ICs) including System-on-Chips (SoCs) to improve the performance of agents such as a processor, a graphics processing unit (GPU), a video decoder, a video encoder, an imaging processor, a digital signal processor (DSP), etc.

A cache allows some data to reside closer to such an agent, leading to lower latency, higher bandwidth, or both, when cache data is accessed. These advantages may be particularly critical to SoC performance because in many cases main memory, e.g. dynamic random access memory (DRAM), does not provide sufficient latency or bandwidth as required by many agents.

Modern SoCs use a hierarchy of caches, typically comprising three levels, where increasing cache levels have increasing capacities but at the expense of performance, such as for example increasing latency and decreasing bandwidth. A first level (L1) cache tends to be relatively small and closely integrated with an agent, whereas a last level cache, for example a level 3 (L3) cache, is relatively large and shared by many or all agents in a SoC.

Many processor architectures, including the ARM® architecture (ARM is a registered trademark of ARM Ltd), define architecturally visible caches, whose behavior is controlled by elements of the architecture. Such controls may relate to whether some data can be cached or not, and can be shared or not. Caches enabled to contain shared data may support a hardware mechanism for cache coherency, so that the most up-to-date version of a piece of data can be used by any agent, regardless of which caches currently contain the data.

Because these architecturally visible caches can be bypassed on purpose, e.g., a request is tagged (marked) as non-cacheable, or by necessity (for agents that do not have access to the cache coherency hardware mechanism), the architecture supports ways to make sure data is flushed from the architecturally visible caches. This is usually done through cache maintenance operations.

Architecturally visible caches enabled to contain shared data may be referred to as coherent caches as they support hardware means to share the data. One such example is a third level cache (L3), which in many systems is the largest and last level of cache.

Another type of cache is system cache, or what is sometimes referred to as memory cache or target-side cache. A system cache is not architecturally visible and requires no direct control from agents in the system, such as cache maintenance operations. Instead, a system cache is enabled to see all traffic going to a particular destination (e.g., main memory), so shared data can be cached and looked up without special maintenance requirements from an agent. Because a system cache caches a particular destination, it is architecturally transparent. Agents may give hints to a system cache regarding the desire to allocate, not to allocate or to de-allocate particular data, but such hints are merely performance hints and are not necessary for proper operation of the system cache.

A coherent architecturally visible cache has an advantage in that it may be finely controlled by architecturally defined operations, and a coherent architecturally visible cache may finely interact with a hardware cache coherency mechanism to provide better effective performance or capacity. For example, a coherent architecturally visible cache may be exclusive of other caches, e.g., data may not be both in the coherent architecturally visible cache and in other lower level caches.

However, agents not participating in a hardware cache coherency mechanism may not be able to use a coherent architecturally visible cache, and the behavior of a coherent architecturally visible cache is in large part dictated by the processor architecture, with less flexibility to improve performance. On the other hand, a system cache may provide caching service to all agents and is very flexible in its handling of data.

In a conventional SoC, the highest level (e.g., L3) of cache is either a coherent architecturally visible cache or a system cache. If the highest level cache is a system cache, the SoC may also have a large coherent architecturally visible cache. The highest level cache is costly in terms of silicon area, so the choice of spending last level cache area on a coherent cache vs. a system cache should be carefully considered as the resulting system behavior may differ greatly, and there may not be the option to achieve the benefits of both types of cache at no or low additional area cost.

SUMMARY

Embodiments of the invention are directed to systems and methods for implementing a hybrid cache.

For example, an exemplary aspect is directed to a system comprising a first agent and a hybrid cache in communication with the first agent. The hybrid cache comprises one or more cache lines, wherein at least one cache line comprises at least one tag field configured to indicate if the cache line belongs to at least one of a logical coherent cache or a logical system cache.

Another exemplary aspect is directed to a method comprising receiving requests at a hybrid cache from a first agent, wherein the hybrid cache comprises one or more cache lines, and setting at least one tag field in at least one cache line to indicate if the cache line belongs to at least one of a logical coherent cache or a logical system cache.

Yet another exemplary aspect is directed to a system comprising a first agent and a hybrid cache comprising in communication with the first agent. The hybrid cache includes one or more cache lines, and means for indicating if the cache line belongs to at least one of a logical coherent cache or a logical system cache.

Another exemplary aspect is directed to a non-transitory computer readable storage medium comprising code, which, when executed by a processor, causes the processor to perform operations managing a hybrid cache, the non-transitory computer readable storage medium comprising: code for receiving requests at the hybrid cache from a first agent, wherein the hybrid cache comprises one or more cache lines, and code for setting at least one tag field in at least one cache line to indicate if the cache line belongs to at least one of a logical coherent cache or a logical system cache.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
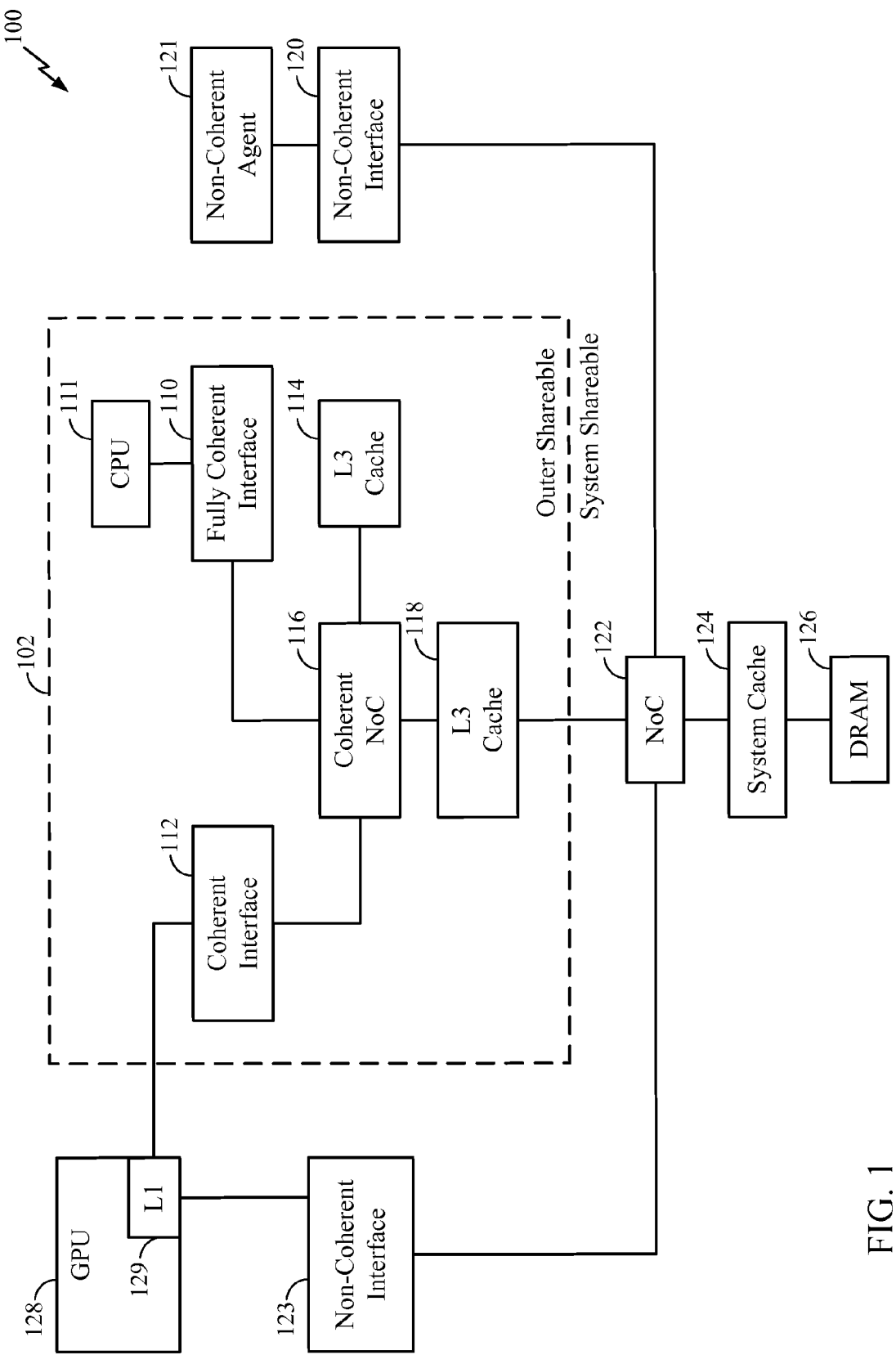
FIG. 1 illustrates a system with both a level 3 coherent architecturally visible cache and a system cache.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment includes an exemplary hybrid cache, and is configured to provide the benefits of both a coherent architecturally visible cache and a system cache, with little or no overhead. The hybrid cache may support architecturally defined behaviors such as cacheability attributes and cache maintenance operations for those agents that support such behaviors. The hybrid cache may interact closely with a hardware cache coherency mechanism to provide improved efficiency, while still providing cache services to all agents with increased flexibility.

An embodiment with hardware cache coherency may have groups of agents, with or without caches, where memory transactions are maintained to be consistent among agents in the group using the hardware coherency mechanism. Different architectures may define, in various ways, the interactions among the agents and their caches. The caches may comprise one or more cache lines as known in the art (sometimes simply referred to herein as a "line" or "lines" of the cache, for brevity). Different potential participants such as the various agents and caches can be dynamically included or excluded from sharing groups. Grouping can also be configured at multiple levels.

As an example, data shared between level 1 (L1) caches of a cluster of processor cores and a level 2 (L2) cache are referred to as inner shareable data. Data shared coherently between the L2 caches of a number of clusters, a number of agents without caches, and a coherent L3 are referred to as outer shareable data. Data shared between agents outside of a group of outer shareable data are not cache coherent and are known as system shareable. In such a case, there is a system cache among all agents and destinations that are accessible by more than one of the agents.

Before describing the embodiments in detail, it is pedagogically useful to consider the SoC 100 shown in FIG. 1. The SoC 100 comprises a coherent outer shareable domain 102. Within the coherent outer shareable domain 102 is a fully coherent central processing unit (CPU) 111 coupled to (in communication with) a fully coherent interface 110. The fully coherent interface 110 may, for example, be compliant with the AMBA® (Advanced Microcontroller Bus Architecture) specification. AMBA is a registered trademark of ARM Ltd. As a specific example, the fully coherent interface 110 may be compliant with the AMBA 4 ACE™ protocol. ACE is a trademark of ARM Ltd.

Included in the coherent outer shareable domain 102 is a coherent interface 112. For example, the coherent interface 112 may be compliant with the ACE-Lite protocol of the AMBA specification, an open standard for on-chip interconnects of functional blocks in a SoC. Shown in FIG. 1 is a GPU (Graphical Processing Unit) 128 coupled to the coherent interface 112. The GPU 128 comprises a cache 129 in communication with the coherent interface 112. The cache 129 may be a level 1 or L1 cache integrated on a same chip or die as GPU 128. The coherent interface 112 is suitable for various media and I/O (Input/Output) masters, such as the GPU 128, to snoop and keep coherent with other master caches coupled to a fully coherent interface, such as for example the CPU 111 coupled to the fully coherent interface 110. In the particular embodiment of FIG. 1, a master coupled to the coherent interface 112, such as the GPU 128, may still snoop other master caches, but other masters do not snoop master caches coupled to the coherent interface 112, such as the cache 129 of the GPU 128.

Included in the coherent outer shareable domain 102 is a dedicated coherent L3 cache 114, and a coherent L3 cache 118 through which accesses to a system memory 126 are made. The system memory 126 may include a DRAM, and for ease of discussion will also be referred to as the DRAM 126. Included in the coherent outer shareable domain 102 is a coherent NoC (Network-on-Chip) 116 to which are coupled the L3 caches 114 and 118 and the coherent interfaces 110 and 112. The coherent NoC 116 provides an interconnect fabric according to a packet-based transport protocol to allow communication among the various components coupled to the coherent NoC 116, such as for example the L3 caches 114 and 118 and the coherent interfaces 110 and 112. The coherent NoC 116 provides conversion between the transaction protocol of the coupled components, e.g., the ACE and ACE-Lite protocols of the AMBA specification, and the transport protocol implemented internally within the coherent NoC 116.

The functional units in FIG. 1 not in the outer shareable domain 102 are in a system shareable domain. In the system shareable domain, a non-coherent agent 121 couples through a non-coherent interface 120, where the non-coherent interface 120 is coupled to a NoC 122. For some embodiments, the non-coherent agent 121 and the non-coherent interface 120 may be compliant with the AXI protocol of the AMBA specification. The system shareable domain also includes the GPU 128, where the cache 129 of the GPU 128 is coupled through a non-coherent interface 123 to the NoC 122. The L3 cache 118, which is in the outer shareable domain 102, is also coupled to the NoC 122.

System memory accesses through the NoC 122 pass through a shared system cache 124, where the system cache 124 accesses the DRAM 126. The GPU 128 may make memory accesses within the coherent outer shareable domain 102 through the coherent interface 112 as discussed previously. For data that need not be shareable through the coherent outer shareable domain 102, the GPU 128 may also make memory accesses to the DRAM 126 within the system shareable domain 102 through the non-coherent interface 123, thereby avoiding overloading the L3 cache 118.

A coherent NoC such as the coherent NoC 116 interacts with L3 caches such as the L3 cache 118 using special cache coherency requests in addition to conventional read and write requests. Some examples of cache coherency requests are cache maintenance operations, which allow agents participating in the hardware cache coherency mechanism to remove lines from the L3 cache 118. The cache coherency requests are invisible outside of the coherent outer shareable domain 102.

A coherent L3 cache, such as for example the L3 cache 118, may return a dirty line to a coherent requester and de-allocate the dirty line without having to write back the dirty line to a backing storage, such as for example the DRAM 126. This is in contradistinction with a conventional non-coherent cache, which requires that a dirty line when requested by an agent be written back to the backing storage when de-allocation is desired. In the particular example of FIG. 1, the NoC 122 implements no coherency capabilities and the system cache 124 is a conventional cache without coherency. The system cache 124 provides a consistent view to all agents of the memory space of destinations, such as the DRAM 126. When the L3 cache 118 performs write backs, the write backs simply pass through the NoC 122 and are serviced by the system cache 124.

Figure 2:
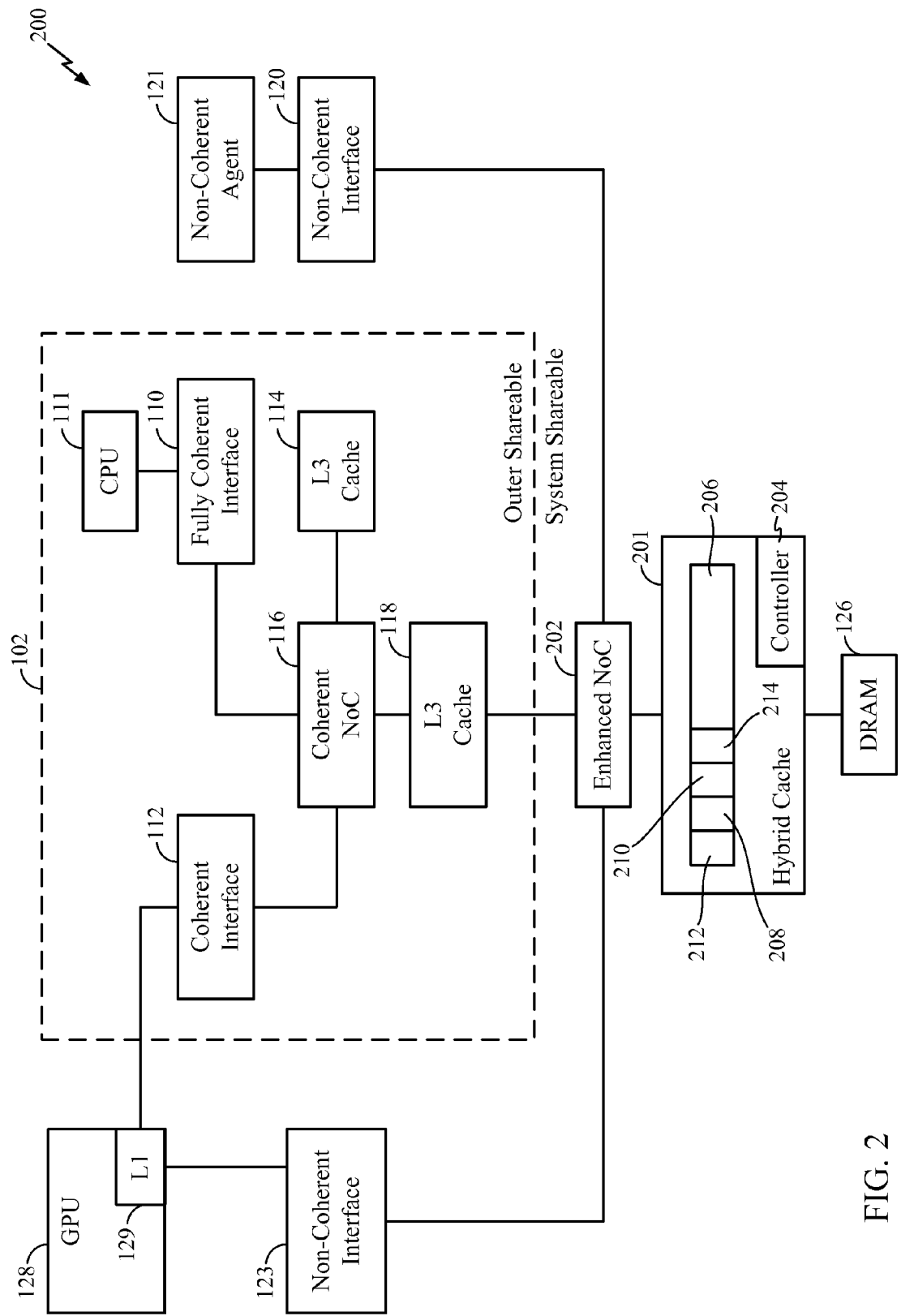
FIG. 2 illustrates a system with a hybrid cache according to an embodiment.

FIG. 2 illustrates a SoC 200 according to an embodiment. Note that in the particular embodiment of FIG. 2, no coherent L3 cache, such as for example the L3 cache 118, is in the coherent outer shareable domain 102 and the coherent NOC 116 directly interfaces with the system shareable domain. Within the system shareable domain of FIG. 2 is an L3 cache, referred to as a hybrid cache 201. The hybrid cache 201 supports cache coherency requests. The hybrid cache 201 communicates with other components by way of an enhanced NoC 202. The enhanced NoC 202 supports transporting cache coherency requests. In the embodiment of FIG. 2, the hybrid cache 201 has a single data backing storage, but serves the logical functions of both a coherent cache for components within the coherent outer shareable domain 102 and as a system cache.

According to an embodiment, the hybrid cache 201 is not partitioned between a coherent cache and a system cache. Instead, any line in the hybrid cache 201 can be tagged (marked) as belonging logically to a coherent cache or a system cache. In some alternative and optional aspects, a line in the hybrid cache 201 can be tagged as belonging logically to both a coherent cache and a system cache. Therefore, in general, a line in the hybrid cache 201 can be tagged as belonging to at least one of a logical coherent cache or a logical system cache. However, it will be understood that in some embodiments, a cache line of hybrid cache 201 may be tagged as belonging logically to either a coherent cache or a system cache, but not both.

The tagging may be implemented by a controller 204 within the hybrid cache 201 setting one or more bits in various tag fields associated with a cache line, and the controller 204 handles the data in a cache line according to the appropriate semantics. For instance, for some embodiments requests for coherent cache maintenance operations may only apply to cache lines tagged as being in a coherent cache, and not to cache lines tagged as being in a system cache. According to some embodiments, cache lines tagged as being in a coherent cache are not visible to agents that are in the system shareable domain but not in the coherent outer shareable domain 102. According to other embodiments, cache lines tagged as being in a coherent cache are visible to agents that are in the system shareable domain but not in the coherent outer shareable domain 102. However, when such agents that are in the system shareable domain but not in the coherent outer shareable domain 102 see a cache line tagged as being in a coherent cache based on a request that results in a hit for the cache line, the cache line must have its tagging updated so that the cache line is not in the coherent cache anymore. Thereby the cache line may lose special functionality that is available only to cache lines marked as being in a coherent cache. The above tagging may comprise one or more bits associated with a cache line.

For example, for the embodiment of FIG. 2, the cache line 206 includes a tag field 208 to indicate whether the cache line 206 logically belongs to a system cache, and a tag field 210 to indicate whether the cache line 206 logically belongs to a coherent cache. In this way, the tag fields 208 and 210 may be set so that the cache line 206 is logically viewed as being in a coherent cache or in a system cache, or both. For those embodiments in which a cache line belongs logically to either a coherent cache or a system cache, but not both, then a single tag field may be used to indicate whether the cache line 206 logically belongs to a system cache or to the coherent cache. Other tag fields may include the tag field 212 to indicate whether the cache line 206 is dirty, and a tag field 214 to indicate whether the cache line 206 is marked as optional. The "optional" tagging will be discussed later. Other tag fields may be associated with the cache line 206, but for simplicity of illustration not all tag fields are shown.

In this way, a given cache line need not be provided in two or more locations in a physical cache, which would otherwise greatly increase complexity. A cache line can be logically migrated from one logical cache to the other (e.g., from a coherent cache to a system cache, or from a system cache to a coherent cache) without having to move the physical data or tag. For example, a cache line can be moved from a coherent cache to a system cache by changing its tagging. By doing this, the cache line becomes visible to all agents in the system shareable domain, but loses some of the special semantics and functions related to being in a coherent cache. For example, a dirty cache line in a system cache is not returned dirty to the coherent agents in the coherent outer shareable domain 102 as would be in the case if the dirty cache line were in a coherent cache.

According to an embodiment, the hybrid cache 201 supports requests for cache maintenance operations originating from the coherent outer shareable domain 102. When a request for coherent cache maintenance operation to the hybrid cache 201 hits a cache line tagged as logically belonging in a coherent cache, then that cache line is handled as directed by the request. In particular, based on the request, the cache line may be de-allocated from the cache and written to a backing storage, such as for example the DRAM 126.

According to some embodiments, a cache line may be logically moved to the system cache by tagging it as belonging to the system cache. In this way the cache line may be logically removed from a coherent cache and logically written back to a system cache, although there is no physical data movement and the cache line stays in the hybrid cache 201. According to some embodiments, the cache line may be removed entirely from the hybrid cache 201 and written back to the DRAM 126. According to some embodiments, the cache line may be removed entirely from the hybrid cache 201 and written back to the DRAM 126 even if the cache line was originally tagged as being part of a system cache, whereas a conventional cache would normally not be subject to coherent cache maintenance requests.

According to some embodiments, a cache line associated with a write request sent by an agent in the coherent outer shareable domain 102 to the hybrid cache 201 may be tagged as "optional," by setting the tag field 214, and allocated in a logical coherent cache as clean (not dirty) by not setting the tag field 212, unlike writes in a conventional system cache that are tagged dirty. Tagging the cache line as clean implies that the data in the cache line does not need to be written back to system memory, e.g., the DRAM 126. Thus, in some aspects, controller 204 may be configured to prevent write back to system memory of a cache line tagged as belonging to the logical coherent cache and as optional. However, the data in the cache line may be sent back to a coherent requester (agent). Sending the data back to the coherent requester is useful to ping pong cache lines between the hybrid cache 201 and a cache in the coherent agent, making the data in the cache lines at least partially exclusive and increasing the total usable capacity.

There can be different semantics for cache lines tagged optional. According to some embodiments, cache lines tagged optional can be migrated as clean cache lines into the logical system cache. According to some embodiments, a cache line tagged optional may be allowed to be dirty with respect to system memory and should either not be put in a logical system cache but discarded instead, or the cache line tagged optional may be allowed to be put in a logical system cache but tagged dirty.

According to some embodiments, a cache line tagged dirty in a logical coherent cache can be sent back as dirty data to a coherent requester (agent) and de-allocated from the hybrid cache 201 if the coherent requester is able to accept the line in the dirty state (or a dirty line). In many cases, coherent requesters with a coherent cache are able to accept dirty cache lines while coherent requesters without a coherent cache are not able to accept dirty cache lines.

According to some embodiments, the protocol in the enhanced NoC 202 and in the hybrid cache 201 contains a flag on read requests ("Accept Dirty") indicating that response data may be passed dirty. The response protocol contains a flag on read responses indicating that the data is passed dirty, so writing it back becomes the responsibility of the coherent system once it is returned. For some embodiments, if a dirty cache line in a logical coherent cache is migrated into a system cache, the dirty cache line is not passed dirty again and must be written back from the hybrid cache 201 eventually. This mechanism is useful to ping pong dirty cache lines between coherent agent caches and the hybrid cache 201 so as to prevent and avoid extra write backs and increase the usable total cache capacity.

FIGS. 3, 4 5 and 6 illustrate methods according to some of the embodiments described above.

Figure 3:
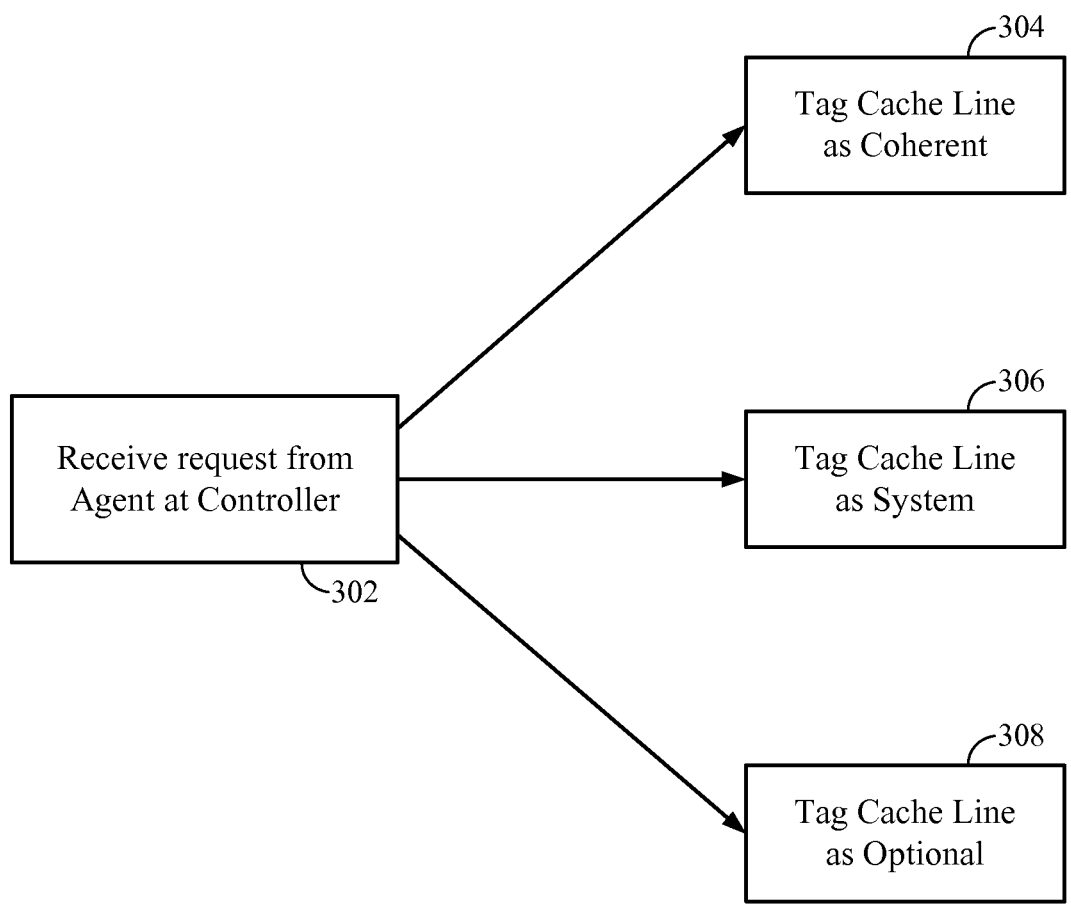
FIG. 3 illustrates a method according to an embodiment.

In FIG. 3, when a request from an agent is received at a controller of a hybrid cache (e.g., the controller 204 of the hybrid cache 201)—step 302, the controller 204 may set indications in various tag fields in a cache line for which there is allocation inside the hybrid cache and based on the request from the agent, in steps 304, 306, or 306. For example, the controller may tag the cache line indicated by the request as logically belonging to a coherent cache (step 304), logically belonging to a system cache (step 306), or as being optional (step 308).

Figure 4:
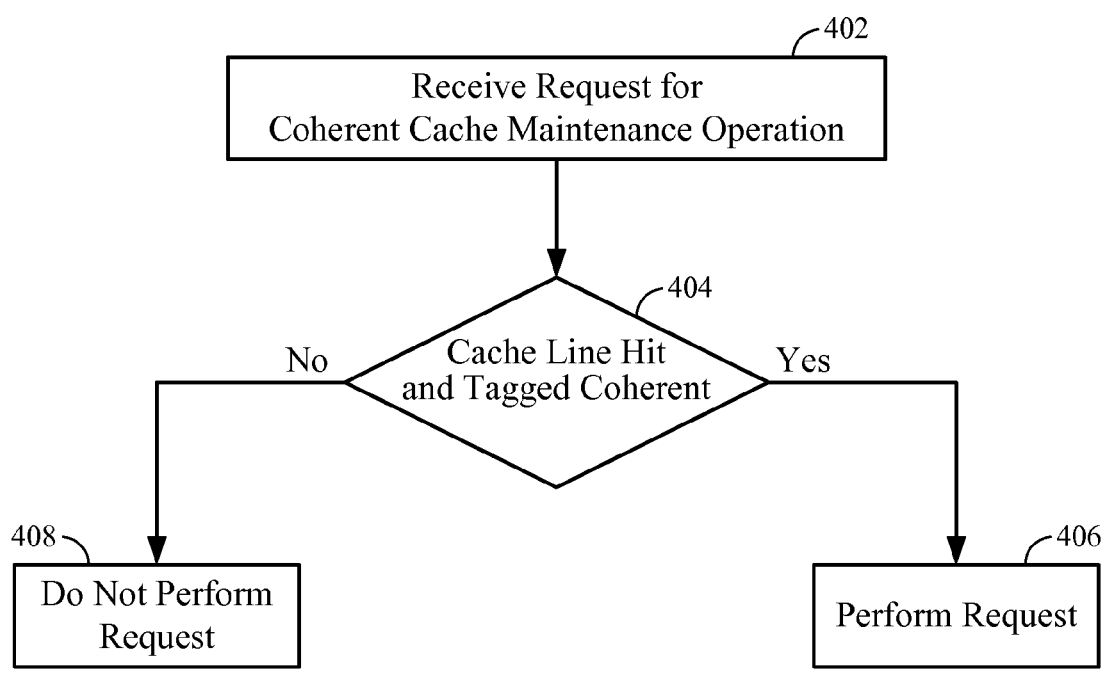
FIG. 4 illustrates a method according to an embodiment.

In FIG. 4, when a request (e.g., a first request) pertaining to a coherent cache maintenance operation is received by the hybrid cache 201 from an agent (step 402), it is determined if there is a cache hit and the cache line pertaining to the request is marked as coherent (step 404). If the cache line is tagged as logically belonging to a coherent cache, the request is performed (step 406) and if the cache line is not tagged as logically belonging to a coherent cache, the request is not performed (step 408).

Figure 5:
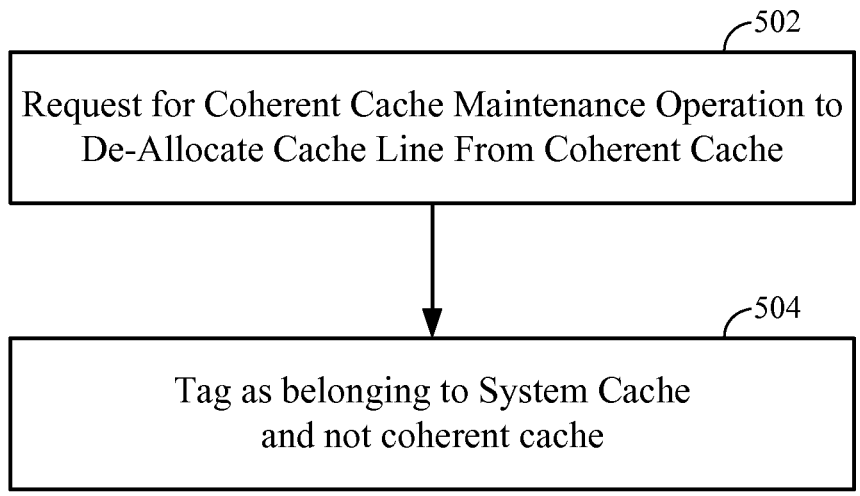
FIG. 5 illustrates a method according to an embodiment.

In FIG. 5, when the hybrid cache receives from an agent another request (e.g., a second request) for a coherent cache maintenance operation to de-allocate a cache line from the logical coherent cache (step 502), the cache line (provided there is a cache hit) may be tagged as belonging to a logical system cache and tagged as no longer belonging to a logical coherent cache (step 504).

Figure 6:
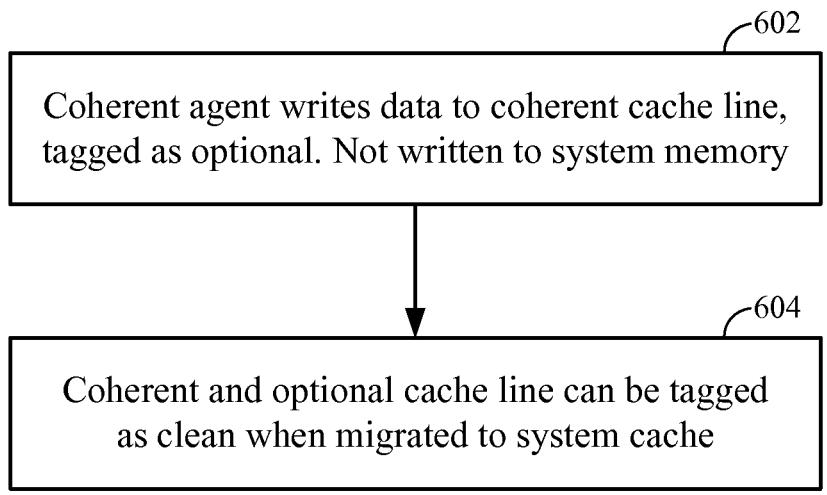
FIG. 6 illustrates a method according to an embodiment.

In FIG. 6, when a coherent agent writes data to the hybrid cache for which the target cache line belongs to a logical coherent cache, the agent may cause, depending upon the request and provided there is a cache hit, the cache line to be tagged as optional (step 602). Thus, the controller 204 may be configured to set the tag field as optional to indicate that the cache line is optional, when the cache line is allocated in response to a write request marked as optional and received from the agent, wherein the agent is a coherent agent. The cache line is not written to system memory. A cache line tagged as optional and that belongs to a logical coherent cache may at a later time be tagged as clean when migrated to a logical system cache (step 604).

Figure 7:
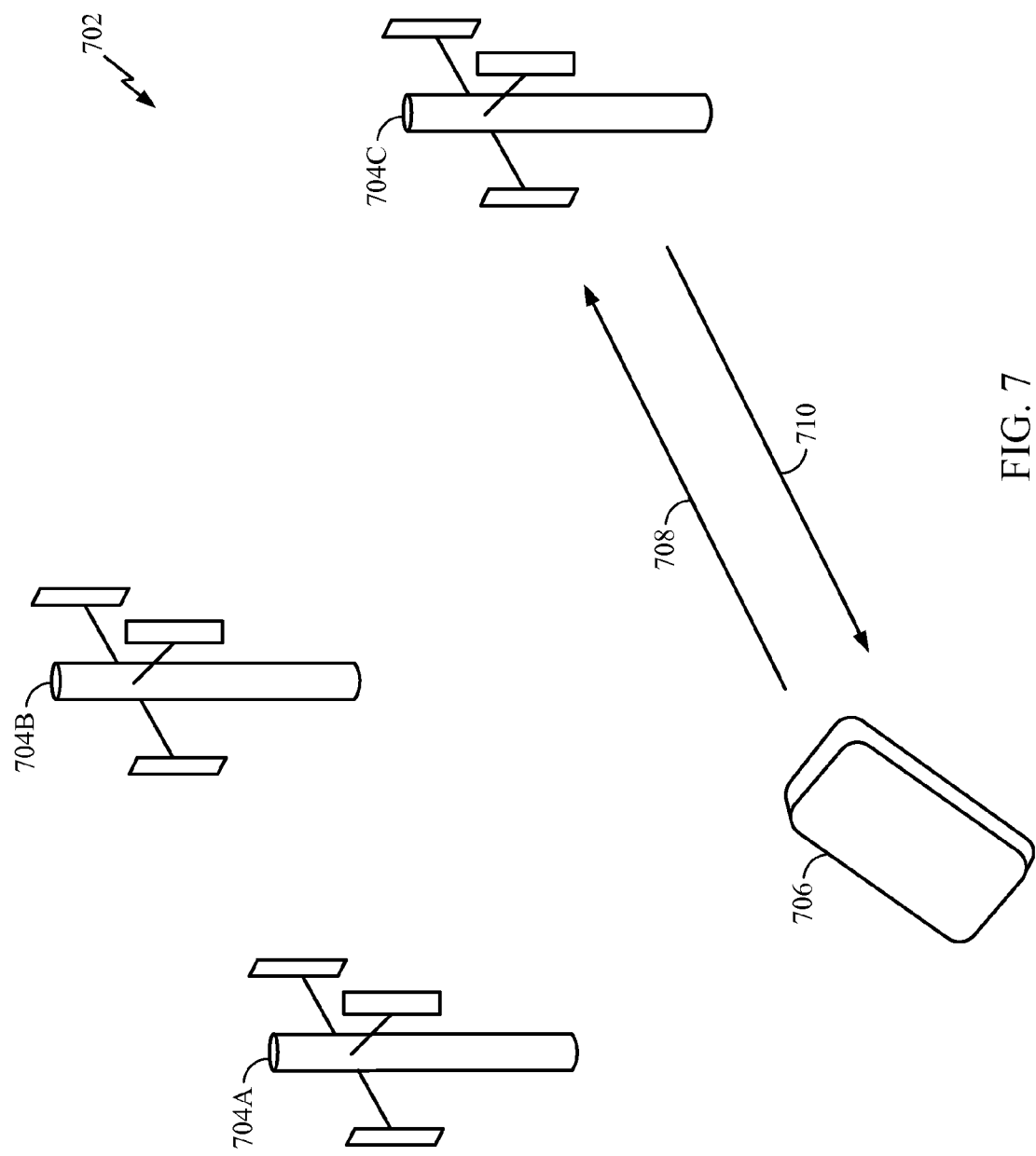
FIG. 7 illustrates a communication network in which an embodiment may find application.

FIG. 7 illustrates a wireless communication system in which embodiments may find application. FIG. 7 illustrates a wireless communication network 702 comprising base stations 704A, 704B, and 704C. FIG. 7 shows a communication device, labeled 706, which may be a mobile communication device such as a cellular phone, a tablet, or some other kind of communication device suitable for a cellular phone network, such as a computer or computer system. The communication device 706 need not be mobile. In the particular example of FIG. 7, the communication device 706 is located within the cell associated with the base station 704C. Arrows 708 and 710 pictorially represent the uplink channel and the downlink channel, respectively, by which the communication device 706 communicates with the base station 704C.

Embodiments may be used in data processing systems associated with the communication device 706, or with the base station 704C, or both, for example. FIG. 7 illustrates only one application among many in which the embodiments described herein may be employed.

Those of skill in the art will appreciate that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Exemplary devices may also be integrated into a set-top box, music player, video player, entertainment unit, navigation device, communications device, personal digital assistant (PDA), fixed location data unit, and a computer.

Accordingly, an embodiment of the invention can include a computer readable media embodying a method for implanting a hybrid cache with both a logical coherent cache part and a logical system cache part. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A system comprising:
   one or more coherent agents;
   one or more non-coherent agents; and
   a hybrid cache in communication with the one or more coherent agents and the one or more non-coherent agents, the hybrid cache comprising one or more hybrid cache lines, wherein a first hybrid cache line of the one or more hybrid cache lines comprises a tag field configured to indicate that the first hybrid cache line belongs to a logical coherent cache wherein the first hybrid cache line is architecturally visible to only the one or more coherent agents, or to a logical system cache wherein the first hybrid cache line is accessible to the one or more coherent agents and the one or more non-coherent agents.

2. The system of claim 1, wherein the hybrid cache comprises: a controller configured to perform a coherent cache maintenance operation if the tag field is set to indicate that the first hybrid cache line belongs to the logical coherent cache, based on a request from a first agent of the one or more coherent agents.

3. The system of claim 2, wherein the coherent cache maintenance operation is configured to de-allocate the first hybrid cache line tagged as belonging to the logical coherent cache based on setting the tag field to indicate that the first hybrid cache line does not belong to the logical coherent cache and belongs to the logical system cache, in response to the request.

4. The system of claim 1, wherein the hybrid cache comprises: a controller configured to set the indication in the tag field based on a request from a first agent of the one or more coherent agents or the one or more non-coherent agents.

5. The system of claim 4, wherein the controller is configured to set the tag field as optional to indicate that the first hybrid cache line is optional, when the first hybrid cache line is allocated in response to a write request marked as optional and received from a second agent of the one or more coherent agents.

6. The system of claim 4, wherein the controller is further configured to set the tag field of the first hybrid cache line tagged as belonging to a logical coherent cache as optional, to indicate that the first hybrid cache line belongs to the logical system cache but not the logical coherent cache in response to a second request.

7. The system of claim 6, wherein the controller is configured to prevent write back to a system memory of the first hybrid cache line tagged as belonging to the logical coherent cache and as optional.

8. The system of claim 1, wherein the hybrid cache is configured to de-allocate and send back the first hybrid cache line further indicated as dirty to a first agent of the one or more coherent agents in a response to a request from the first agent, when the first hybrid cache line is tagged as belonging to the logical coherent cache.

9. The system of claim 1, wherein the hybrid cache is configured to receive a flag in a request from a first agent of the one or more coherent agents or the one or more non-coherent agents, the flag configured to indicate that the first agent can accept a dirty line in response to the request.

10. The system of claim 1, wherein the system is integrated in a device selected from the group consisting of a set-top box, music player, video player, entertainment unit, navigation device, communications device, personal digital assistant (PDA), fixed location data unit, and a computer.

11. A method comprising:
    receiving requests at a hybrid cache from one or more coherent agents, one or more non-coherent agents, or combinations thereof, wherein the hybrid cache comprises one or more hybrid cache lines, wherein a first hybrid cache line of the one or more hybrid cache lines comprises a tag field to indicate the first hybrid cache line belongs to a logical coherent cache wherein the first hybrid cache line is architecturally visible to only the one or more coherent agents, or to a logical system cache wherein the first hybrid cache line is accessible to the one or more coherent agents and the one or more non-coherent agents.

12. The method of claim 11, further comprising performing coherent cache maintenance if the first hybrid cache line is tagged as belonging to the logical coherent cache.

13. The method of claim 12, further comprising de-allocating the first hybrid cache line tagged as belonging to the logical coherent cache by setting the tag field of the first hybrid cache to indicate the first hybrid cache line does not belong to the logical coherent cache and belongs to the logical system cache.

14. The method of claim 11, comprising setting the tag field as optional to indicate that the first hybrid cache line is optional, when the first hybrid cache line is allocated in response to a write request received from a coherent agent.

15. The method of claim 11, comprising setting the tag field of the first hybrid cache line tagged as belonging to a logical coherent cache as optional, to indicate that the first hybrid cache line belongs to the logical system cache but not the logical coherent cache in response to a second request.

16. The method of claim 15, further comprising prevent write back to a system memory of the first hybrid cache line tagged as belonging to the logical coherent cache and as optional.

17. The method of claim 11, comprising de-allocating and sending back the first hybrid cache line further tagged as dirty, to a first agent of the one or more coherent agents, when the first hybrid cache line is tagged as belonging to the logical coherent cache, in a response to a request from the first agent.

18. The method of claim 11, comprising receiving, at the hybrid cache, a flag in a request from a first agent of the one or more coherent agents or the one or more non-coherent agents, the flag to indicate that the first agent can accept a dirty response in response to the request.

19. The method of claim 11 further comprising receiving requests from at least one coherent agent and at least one non-coherent agent at the hybrid cache.

20. A system comprising:
one or more coherent agents;
one or more non-coherent agents; and
a hybrid cache in communication with the one or more coherent agents and the one or more non-coherent agents, the hybrid cache comprising one or more hybrid cache lines, wherein a first hybrid cache line of the one or more hybrid cache lines comprises a means for indicating that the first hybrid cache line belongs to a logical coherent cache wherein the first hybrid cache line is architecturally visible to only the one or more coherent agents, or to a logical system cache wherein the first hybrid cache line is accessible to the one or more coherent agents and the one or more non-coherent agents.

21. The system of claim 20, wherein the means for indicating is based on requests received from the one or more coherent agents, the one or more non-coherent agents, or combinations thereof.

22. The system of claim 20, further comprising means for performing coherent cache maintenance operations if the first hybrid cache line belongs to the logical coherent cache.

23. The system of claim 22, further comprising means for de-allocating the first hybrid cache line belonging to the logical coherent cache.

24. The system of claim 20, further comprising means for indicating that the first hybrid cache line is optional, when the first hybrid cache line is allocated in response to a write request received from a coherent agent.

25. The system of claim 20, comprising means for changing an indication that the first hybrid cache line belongs to a logical coherent cache, as optional, to indicate that the first hybrid cache line belongs to the logical system cache but not the logical coherent cache in response to a second request.

26. The system of claim 25, further comprising means for preventing write back to a system memory of the first hybrid cache line tagged as belonging to the logical coherent cache and as optional.

27. The system of claim 20, comprising means for de-allocating and sending back the first hybrid cache line of the hybrid cache to a first agent, when the first hybrid cache line is indicated as dirty and as belonging to the logical coherent cache, in a response to a request from a coherent agent.

28. A non-transitory computer readable storage medium comprising code, which, when executed by a processor, causes the processor to perform operations managing a hybrid cache, the non-transitory computer readable storage medium comprising: code for receiving requests at a hybrid cache from one or more coherent agents, one or more non-coherent agents, or combinations thereof, wherein the hybrid cache comprises one or more hybrid cache lines, wherein a first hybrid cache line of the one or more hybrid cache lines comprises a tag field to indicate the first hybrid cache line belongs to a logical coherent cache wherein the associated hybrid cache line is architecturally visible to only the one or more coherent, or to a logical system cache wherein the first hybrid cache line is accessible to the one or more coherent agents and the one or more non-coherent agents.

* * * * *